Oct. 18, 1932.  J. S. STULL ET AL  1,883,080
APPARATUS FOR FORMING ARTICLES
Filed Sept. 16, 1930  2 Sheets-Sheet 1
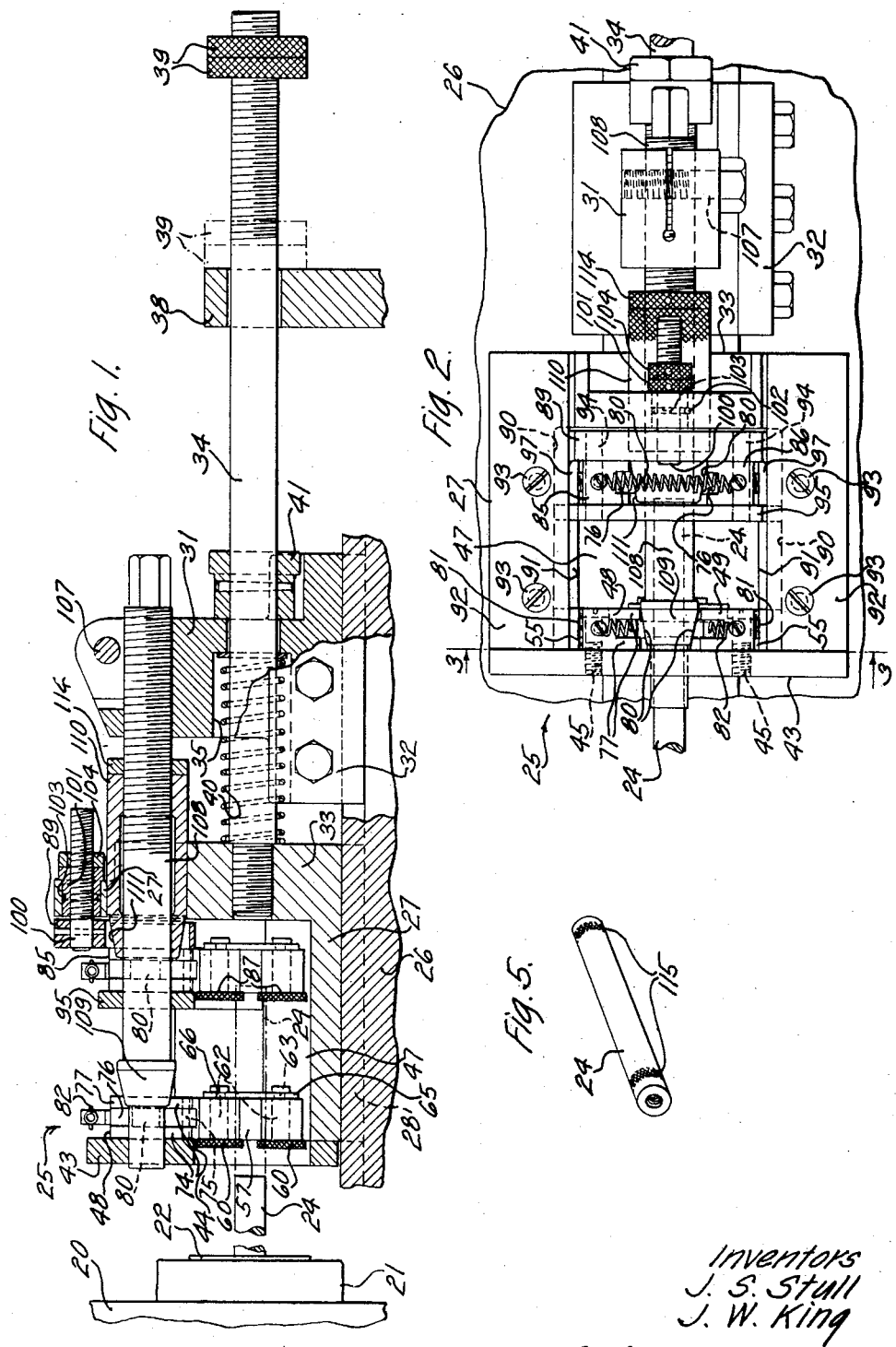
Inventors
J. S. Stull
J. W. King
By H.B. Whitfield Att'y.

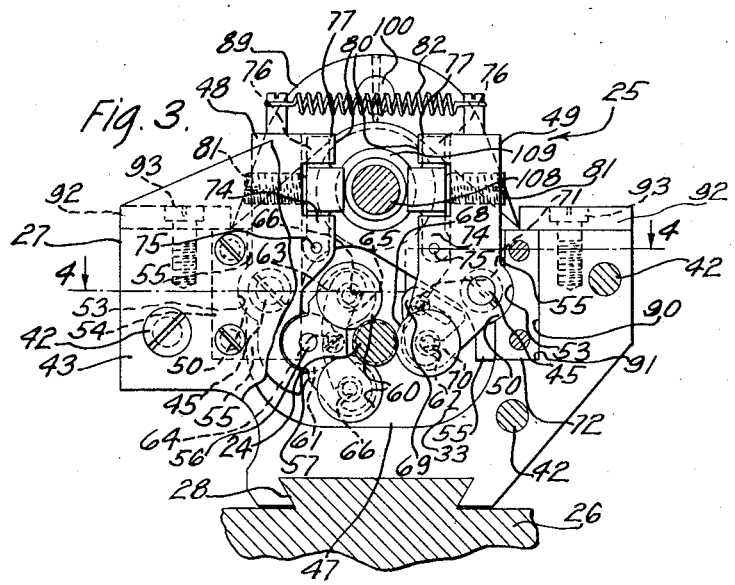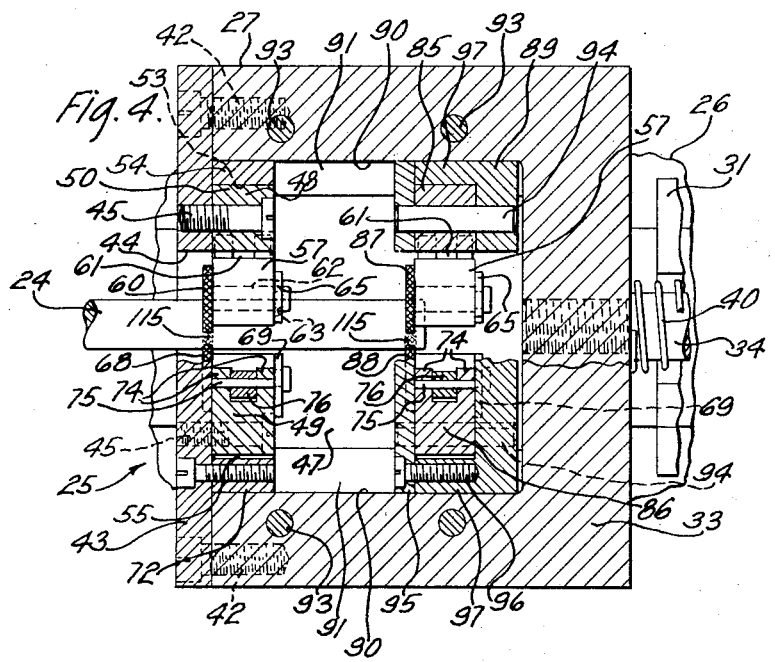

Patented Oct. 18, 1932

1,883,080

UNITED STATES PATENT OFFICE

JOHN S. STULL, OF CHICAGO, AND JOHN W. KING, OF OAK PARK, ILLINOIS, ASSIGNORS TO WESTERN ELECTRIC COMPANY, INCORPORATED, OF NEW YORK, N. Y., A CORPORATION OF NEW YORK

APPARATUS FOR FORMING ARTICLES

Application filed September 16, 1930. Serial No. 482,282.

This invention relates to apparatus for forming articles, and more particularly to forming apparatus for automatic machines designed to produce piece parts.

The primary object of this invention is to provide an improved apparatus for rapidly and accurately forming the surface of an article preferably simultaneously at a plurality of spaced points.

In accordance with the general features of this invention there is provided in one embodiment thereof, as applied to the tool slide of an automatic screw machine, an apparatus comprising a frame reciprocably mounted on the tool slide and carrying a plurality of pivotal spring retracted levers supporting two or more sets of rotatable forming rolls, such as knurling or planishing rolls, arranged for engagement with the work or article, carried in the rotating work spindle of the screw machine, the rolls of each set being spaced circumferentially and the respective sets being spaced longitudinally of the article. The frame is operatively connected to the tool slide and is moved to a predetermined point to position the rolls longitudinally of the article; thereafter the slide in its continued movement operates a camming rod carried by the slide which simultaneously actuates the plurality of levers to move the rolls into engagement with the rotating article. Provision is made for adjusting the spacing between the sets of rolls to cause a knurling or planishing of the article at predetermined longitudinal points thereof, for varying the movement of the frame to position the rolls longitudinally of the article, and also to vary individually the movement of each set of levers supporting the forming rolls toward the article for determining the depth to which the surface of the article is to be formed at each longitudinal point of the article.

Other objects and advantages of this invention will more fully appear from the following detailed description, taken in connection with the accompanying drawings, wherein Fig. 1 is a central vertical sectional view, partly in elevation, illustrating the invention embodied in a knurling apparatus attached to an automatic screw machine which is shown fragmentarily;

Fig. 2 is a fragmentary plan view thereof with the apparatus in an actuated position;

Fig. 3 is an enlarged vertical section, partly in elevation, taken on the line 3—3 of Fig. 2;

Fig. 4 is an irregular plan section taken on the line 4—4 of Fig. 3;

Fig. 5 is a detail detached view of one of the sets of knurling rolls and its supporting lever, and Fig. 6 is a perspective view of a knurled relay core as produced upon a screw machine equipped with the knurling apparatus of this invention.

Referring now to the drawings, and particularly to Figs. 1 and 3, the knurling apparatus embodying the features of this invention is designed to be applied to an automatic screw machine of the type wherein a plurality of tools (not shown) are positioned at spaced points, and an equal number of bars of stock material are held in spindles which are rotatably mounted in a spindle head, which is intermittently rotated to index the bars successively into juxtaposition with each of the stations. The tools are mounted on a common tool slide which is designed to be advanced periodically to bring the tools into operative positions relative to the bars of stock, and the bars are constantly rotated about their respective axes by the spindles to cause the various tools carried by the tool slide to perform work on the bars. In Fig. 1 there is illustrated fragmentarily a rotatable spindle head 20 which carries a plurality of spindles 21 which terminate in chucks 22, only one of which is shown in the drawings, since all are identical in construction. The spindles 21 are positioned at spaced points around the periphery of the spindle head 20 and are designed to receive the several bars of stock 24. The spindles 21 are rotated about their respective axes by suitable known driving means (not shown), the bars 24 being periodically advanced longitudinally of the spindles by suitable advancing means, which form a part of the known automatic machines and are not shown in the drawings.

A knurling apparatus 25 is mounted upon a tool slide 26, which is periodically actuated, by means not shown, to cause it to move toward and away from the chuck 22. The knurling apparatus 25 comprises a carriage or frame 27 reciprocably mounted upon the tool slide 26 by means of a dove tail and slot connection 28. Carried on the tool slide 26 at the right of the frame 27 and centered therewith as shown in Fig. 2, by being mounted on the dove tail of the tool slide, is a standard 31. The standard 31 is fixed to the tool slide 26 by a clamping plate 32 which forms one side of the dove tail slot in the standard. Threaded into a vertical right wall 33 of the frame 27 is a rod 34 which extends to the right thereof and freely movable through a shouldered aperture 35 (Fig. 1) in the standard 31 and an aperture in a stop lug 38 carried by a stationary part of the screw machine, the extreme right end of the rod being threaded for the reception of a pair of stop collars 39. Surrounding the rod 34 between the wall 33 of the frame 27 and a washer engaging an annular surface of the shouldered aperture 35 of the standard 31 is a compression spring 40. Fixed to the rod 34 at the right of the standard 31 is a stop collar 41 which, when the apparatus is idle as shown in Fig. 1, is in abutting relation with the standard 31 through the action of the spring 40.

The frame 27 at its left end has fixed thereto by screws 42 (Figs. 3 and 4) a plate 43 forming a vertical end wall, the plate having an aperture 44 adjacent its lower edge into which the end of the bar stock 24 carried by the rotating chuck 22 is entered in the movement of the tool slide 26 forwardly or toward the left in the operation of the screw machine. Pivoted, as indicated at 45 (Fig. 5), on the inner side of the plate 43 at opposite sides of the aperture 44 thereof and within a hollow 47 of the frame 27 are two levers 48 and 49. An arcuate enlargement 50 on each of the levers 48 and 49 upon the outer sides of the pivot points 45 thereof turns in a complementary depression 53 formed in a stationary block or shoe 54 fixed to the inner side of the plate 43 and thus provides a firm support for the levers so that no appreciable deflection of the levers will occur at their pivots in the operation of knurling. Suitable clearance spaces 55 are provided between the opposed surfaces of the levers 48 and 49 and the shoes 54 above and below the pivot points 45 to permit upper and lower ends of the levers to have a desired angular movement from the position thereof, as shown in Figs. 3 and 5, wherein they are in an actuated position, without engaging the corresponding ends of the shoes. To the lower end of the lever 48 at its inner side is pivoted, as indicated at 56, a bracket 57 supporting at equally spaced points from the pivot 56 a pair of knurling rolls 60. The bracket 57 is bifurcated at its pivot portion and fits over a tongue 61 on the lever 48; a pin fixed to the furcations of the bracket and loosely fitted in the tongue 61 serves to pivot the bracket on the lever. Each of the knurling rolls 60 has a reduced portion 62 which freely extends through an aperture in the bracket 57 (Figs. 1, 4 and 5), the outer end of the portion 62 outside of the bracket 57 having an annular channel 63. Pivoted on the bracket 57 as indicated at 64 (Fig. 5) is a lock plate 65, opposite ends of which are formed with slots 66 extending from opposite sides of the plate, the slots arranged to cooperate with the channels 63 of the knurling rolls 60 when in the position shown in the drawings to prevent the rolls from moving longitudinally on the bracket 57. By rocking the plate 65 clockwise (Fig. 5) about its pivot 64 it will be apparent that the opposite ends thereof may be disengaged from the projecting channeled ends of the rolls 60 to permit ready removal and replacement thereof.

Rotatably mounted directly on the lower end of the lever 49, as indicated at 67 (Fig. 3), is a single knurling roll 68 which is identical with the rolls 60 carried on the bracket 57. A locking plate 69 having a slot 70 which cooperates with the annular channel 63 of the roll 68 serves to hold the roll upon the lever 49 in a manner similar to that described in connection with the rolls 60, only the plate 69 is slidably mounted on the lever by means of a screw and slot connection 71 (dotted outline Fig. 3). A shoe 72, substantially similar to the shoe 54, is fixed to the plate 43 and cooperates with the lever 49 for the same purpose as the shoe 54 with the lever 48, as hereinbefore described. As shown in Fig. 3, when the rolls 60 and 68 are engaged with the periphery of the bar stock 24 they are spaced 120° apart and thereby exert an equal lateral pressure on the rotating bar stock so that no appreciable lateral deflection thereof or of the chuck 22 and the driving spindle 21 therefore occurs during the knurling operation. The upper ends of the levers 48 and 49 and the elements associated therewith are substantially similar in both instances so that the following description of the upper end of the right hand lever 49 (Figs. 3 and 4) will apply to the lever 48.

Pivoted on the lever 49 between a pair of lugs 74 on the inner side of the lever as indicated at 75 is a vertical lever 76, the upper end of which has a sliding fit between a pair of lugs 77 on the upper end of the lever in line with the lugs 74. Each of the levers 76 is provided with an inclined face 80 upon their inner opposed sides at a point between the two sets of lugs 74 and 77 of the levers 48 and 49. The faces 80 upon the levers 76 are inclined in opposite directions, as clearly shown in Fig. 2, and in the operation of the apparatus are simultaneously engaged by reciprocable cams, to be referred to hereinafter, which rock the levers 48 and 49 about their pivots in anticlockwise and clockwise directions, respectively, as viewed in Fig 3, and thereby moving the knurling rolls 60 and 68 toward each other and into operative engagement with the rotating bar stock 24. Set screws 81 threaded into the levers 48 and 49 and engaging at their inner ends the levers 76 serve as a means for initially setting the inclined faces 80 of the levers 76 in predetermined transverse relation with the hereinbefore mentioned reciprocable cams, thereby providing means for varying the depth of the knurls to be formed on the bar of stock 24 by the two sets of rolls. The depth of the knurls, it will be apparent, will depend on the relation between the cams and the faces 80 which will result in a predetermined movement of the sets of levers, supporting the rolls, toward the article. The levers 76 may also be adjusted in the same manner to compensate for wear on the faces 80 and the reciprocable cams, or for small manufacturing irregularities in the rolls and the several associated parts. The rollers 60 and 68 are retracted from the bar stock 24 after a knurling operation and held until next actuated by a tension spring 82, opposite ends of which are attached to pins fixed in the upper end surfaces of the levers 48 and 49.

A second pair of levers 85 and 86, similar to the levers 48 and 49, and carrying knurling rolls 87 and 88, respectively, similar to the rolls 60 and 68, are pivotally carried on a vertical plate 89 which is adjustably mounted on finished surfaces 90 and 91 of the frame 27 within the hollow 47 thereof, the plate being retained vertically in the frame by a pair of plates 92 fixed to the frame 27 by screws 93 and fitting over opposite shouldered surfaces of the plate. The levers 85 and 86 are mounted for rotation on pins 94 fixed at opposite ends in the plate 89 and an end plate 95 fixed by screws 96, one of the screws being illustrated in Fig. 4, to outer faces of shoe portions 97 integral with the plate 89 and similar to and provided for the same purpose as the shoes 54 associated with the levers 48 and 49. At its upper end in vertical alignment with the axis of the bar stock 24 and intermediate the sets of oppositely disposed levers carrying the knurling rolls the plate 89 has fixed thereto one end of a rod 100 which is threaded at its right end. Threaded onto the rod 100 is a nut 101 enlarged at its right end and knurled on its periphery, the reduced left end of the nut being rotatably mounted in an aperture in the upper end of the vertical wall 33 of the frame 27. The nut 101 is prevented from moving longitudinally upon the rod 100 by a pin 102 (Fig. 2) fixed in the frame 27, the middle portion of the pin fitting in a peripheral annular channel 103 formed in the reduced left end of the nut 101.

It will be apparent, with the nut 101 prevented from longitudinal movement by means of the fixed pin 102 associated with the channel 103 thereof, that by rotating the nut upon the threaded rod 100 the latter will be moved longitudinally relative to the frame 27 and thus carry with it the plate 89 supporting the knurling rolls 85 and 86, which carry the knurling rolls 87 and 88. The purpose of the adjustment of the knurling rolls 87 and 88 relative to the fixed rolls 60 and 68 is to provide means for knurling the bar stock 24 at predetermined longitudinal points thereof. In the drawings the spacing between the two sets of knurling rolls is at a maximum and to shorten this space the nut 101 is rotated in a direction which will move the plate 89 to the left (Fig. 1) and when the desired spacing is effected the nut 101 is locked by a lock nut 104.

Clamped as indicated at 107 to the standard 31 which, as hereinbefore described, is fixed to the tool slide 26, is a rod 108 threaded at its right end (Fig. 1) and with its extreme left end reduced in diameter and reciprocably supported in an aperture in the plate 43 of the frame 27. The rod 108 is centered vertically with the bar stock 24 and the inclined faces 80 on the two sets of levers 76 and also horizontally with the faces 80 as shown in Fig. 3. Formed on the rod 108 adjacent its right end is an annular cam face 109 which during the operation of the apparatus engages with the faces 80 of the levers 76 carried by the levers 48 and 49. Threaded on the rod 108 and reciprocably mounted in aligned apertures in the vertical wall 33 of the frame 27 and the plate 89 is a sleeve 110 provided with an annular cam face 111 which in the operation of the apparatus engages with the faces 80 of the levers 76 carried by the levers 85 and 86. In the normal position of the apparatus, due to the action of the springs 82, the faces 80 of the levers 76 engage the periphery of the rod 108 adjacent the left ends of the cam faces 109 and 111, the ends thereof being beveled to permit the faces 80 to move onto the cam faces as the rod 108 is moved towards the left in the operation of the apparatus. After the desired positioning of the sleeve 110 on the rod 108 to provide a predetermined spacing between the cam faces 109 and 111, which should correspond with the spacing between the two sets of faces 80 on the levers 76, the sleeve is locked in position by a lock nut 114. The rod 108 has a threaded engagement with the standard 31 so that the rod with both of the cam faces 109 and 111 may be simultaneously adjusted to a predetermined longitudinal position relative to the two sets of oppositely disposed faces 80 of the levers 76. The right end of the rod is hexagon to facilitate the rotation of the rod upon releasing the clamp 107.

Although in the particular article receiving the knurled surfaces, a relay core, the depth of the knurl at each portion thereof should preferably be of the same depth, in some instances, it may be found desirable to vary the depth of the knurl at one portion relative to the opposite knurl. This, it will be apparent, may be readily effected by adjusting, in the manner hereinbefore described, the inclined faces 80 of one set of levers 76 in a predetermined different transverse relation with respect to the faces 80 with the other set of levers so that a different movement is imparted to the knurling rolls of one set of levers toward the article than the corresponding movement of the rolls associated with the other set of levers.

In the operation of the automatic screw machine equipped with the knurling apparatus 25, the mechanism of which has been described hereinbefore, one of the rotating bars of stock 24 is indexed at a predetermined period into juxtaposition with the left end of the knurling apparatus, as shown in Fig. 1. The bar of stock 24 being properly indexed, the tool slide 26 and standard 31 fixed thereto are moved towards the left or forwardly through a predetermined distance by means (not shown) but forming a part of the known automatic machines. As the standard 31 moves forward the frame 27 is also moved forward by the action of the spring 40 surrrounding the rod 34 between the frame and the standard until the stop collars 39 upon the rod engage the stop lug 38 to arrest its further movement. At this point in the movement of the tool slide 26 and the standard 31 the frame 27 will have been moved to a position determined by the setting of the stop collars 39 on the rod 34 relative to the stop lug 38, thereby positioning the several sets of predeterminedly spaced knurling rolls longitudinally of the bar stock 24, as indicated by the broken outline of the rotating bar stock 24 in Fig. 1. The knurling rolls at this point in the operation of the apparatus are held in a retracted position by the springs 82 connected to the levers 60 and 68 and 85 and 86, which carry the rolls, thus permitting the bar stock 24 to be freely entered therebetween in the forward movement of the frame 27.

In the continued movement of the tool slide 26 to complete its forward movement the standard 31 moving therewith advances the rod 108 carrying the predeterminedly spaced annular cam faces 109 and 111 thereon into operative engagement (Fig. 2) with the inclined faces 80 of the levers 76 carried on the sets of levers 48 and 49 and 85 and 86, thereby rocking the lower ends of the levers of each set toward each other and consequently moving the knurling rolls 60, 68, 85, and 86 simultaneously into operative engagement with the periphery of the rotating bar stock 24 (Fig. 3) which is then knurled as indicated at 115 (Fig. 6). Upon completion of the knurling operation, as just described, the tool slide 26 is moved backward to its normal position and immediately this movement commences, the spring 40 which was progressively compressed during the forward movement of the tool slide immediately expands and the frame 27 is moved forward upon the tool slide 26 relative to the standard 31 which is moving backward with the tool slide and the cam faces 109 and 111 on the rod 108, moving with the standard 31, are withdrawn from operative engagement with the faces 80 of the levers 76. The springs 82 connected to the levers supporting the knurling rolls immediately act to retract the rolls from the knurled peripheral portions 115 of the rotating bar stock 24. When the tool slide 26 reaches the limit of its backward movement the standard 31 abuts the stop collar 41 on the rod 34 which is attached to the frame 27, thereby insuring the correct normal position of the frame for the following cycle of operation of the knurling apparatus 25.

Although the invention has been disclosed and described as embodied in a knurling apparatus, it is clear that it may have a more general application, for instance, for planishing operations, and that modifications can be made without departing from the spirit and scope of the appended claims.

What is claimed is:

1. In a forming apparatus, a frame, oppositely disposed movable elements mounted on the frame, movable members on the elements having oppositely inclined and aligned surfaces, forming rolls carried on the elements for engaging the periphery of a rotating article inserted therebetween, a movable member having a cam surface operatively engageable with the said surfaces of the movable members on the elements for actuating the latter to move the rolls into forming engagement with the article, and means for adjusting the movable members on the elements to vary the movement imparted to the rolls toward the article for determining the depth to which the surface of the article is to be formed.

2. In a knurling apparatus, a frame, a plurality of spaced aligned sets of oppositely disposed movable elements mounted on the frame, means for relatively moving the sets of elements on the frame to vary the space therebetween, knurling rolls carried on the elements for engaging the periphery of a rotating article inserted therebetween, and means movable simultaneously into operative engagement with the elements of each set for actuating the latter to move the rolls into knurling engagement with the article.

3. In a knurling apparatus, a frame, a member reciprocably mounted on the frame, a set of oppositely disposed movable elements mounted on the frame, a second set thereof mounted on the member in alignment with the first set and predeterminedly spaced therefrom, means for adjusting the member on the frame to vary the space between the two sets of elements, knurling rolls carried on the elements for engaging the periphery of a rotating article inserted therebetween, and means movable simultaneously into operative engagement with the elements of each set for actuating the latter to move the rolls into knurling engagement with the article.

4. In a knurling apparatus, a frame, a plurality of spaced sets of oppositely disposed pivotal elements mounted on the frame, pivotal members on the elements of each set having oppositely inclined and aligned faces, knurling rolls carried on the elements for engaging the periphery of a rotating article inserted therebetween, a reciprocal member having cam faces spaced in accordance with the said faces of the members on the elements and movable simultaneously into operative engagement therewith for actuating the elements to move the rolls into knurling engagement with the article, and means for adjusting the pivotal members on the elements to vary the movement imparted to the rolls toward the article for determining the depth of the knurl on the article.

5. In a knurling apparatus, a frame, a plurality of spaced sets of oppositely disposed movable elements having oppositely inclined and aligned surfaces mounted on the frame, means for relatively moving the sets of elements on the frame to vary the space therebetween, knurling rolls carried on the elements for engaging the periphery of a rotating article inserted therebetween, a movable member having a cam surface, a member mounted on said movable member having a cam surface, means for adjusting the member mounted on said movable member thereon to space the cam surfaces in accordance with the said surfaces on the elements, and means for actuating the movable member to move the cam surfaces thereon into operative engagement with the said surfaces of the elements of each set for actuating the latter to move the rolls into knurling engagement with the article.

6. In a forming apparatus, means for rotating work, a reciprocable slide mounted opposite a free end of the work for movement longitudinally of the axis of rotation of the work, a carriage reciprocally mounted on the slide for movement in a corresponding direction, oppositely disposed movable elements mounted on the carriage, forming rolls carried on the elements for engaging the periphery of the work, means for advancing the slide toward the work through a predetermined distance, resilient means between the carriage and the slide for effecting the advance of the carriage with the slide, means for preventing further advance of the carriage during the continued advance of the slide after the forming rolls have been predeterminedly positioned longitudinally of the work, and means movable with the slide for operatively engaging the elements after the rolls are longitudinally positioned for actuating the elements to move the rolls into forming engagement with the work.

7. In a forming apparatus, means for rotating work, a reciprocable slide mounted opposite a free end of the work for movement longitudinally of the axis of rotation of the work, a carriage reciprocably mounted on the slide for movement in a corresponding direction, oppositely disposed movable elements mounted on the carriage, forming rolls carried on the elements for engaging the periphery of the work, means for advancing the slide toward the work through a predetermined distance, cooperating extensions on the carriage and the slide, resilient means carried on the carriage extension and between the carriage and the slide for effecting the advance of the carriage with the slide, adjustable means on the carriage extension cooperating with a fixed portion of the apparatus for preventing further advance of the slide after the forming rolls have been predeterminedly positioned longitudinally of the work, and means movable with the slide for operatively engaging the elements after the rolls are longitudinally positioned for actuating the elements to move the rolls into forming engagement with the work.

8. In a forming apparatus, a frame, oppositely disposed movable elements mounted on the frame, movable members on the elements having oppositely inclined and aligned surfaces, forming rolls carried on the elements for engaging the periphery of a rotating article inserted therebetween, a movable member having a cam surface operatively engageable with the said surfaces of the movable members on the elements for actuating the latter to move the rolls into forming engagement with the article, and means carried by each of the movable elements for individually adjusting each of the movable members on the elements to vary the movement imparted to the rolls toward the article for determining the depth to which the surface of the article is to be formed.

In witness whereof, we hereunto subscribe our names this 5th day of September, A. D., 1930.

JOHN S. STULL.
JOHN W. KING.